United States Patent [19]

Thapar et al.

[11] Patent Number: 5,774,714
[45] Date of Patent: Jun. 30, 1998

[54] ZONE BIT RECORDING ENHANCED VIDEO DATA LAYOUT

[75] Inventors: Manu Thapar, Fremont; Shenze Chen, Cupertino, both of Calif.

[73] Assignee: Hewlett-Packard Company, Palo Alto, Calif.

[21] Appl. No.: 411,364

[22] Filed: Mar. 27, 1995

[51] Int. Cl.[6] .................................................. G06F 17/30
[52] U.S. Cl. ........................................... 395/611; 395/481
[58] Field of Search ........................ 364/DIG. 1, DIG. 2; 395/600, 611, 602, 404, 438, 481, 483, 485; 348/6–10, 12, 13

[56] References Cited

U.S. PATENT DOCUMENTS

| | | | |
|---|---|---|---|
| 4,835,686 | 5/1989 | Furuya et al. | 395/463 |
| 4,843,389 | 6/1989 | Lisle et al. | 341/106 |
| 4,920,478 | 4/1990 | Furuya et al. | 395/463 |
| 5,172,413 | 12/1992 | Bradley et al. | 380/20 |
| 5,305,438 | 4/1994 | MacKay et al. | 395/164 |
| 5,410,343 | 4/1995 | Coddington et al. | 348/7 |
| 5,420,998 | 5/1995 | Horning | 395/440 |
| 5,440,686 | 8/1995 | Dahman et al. | 395/164 |
| 5,485,610 | 1/1996 | Gioielli et al. | 395/600 |
| 5,510,905 | 4/1996 | Birk | 358/342 |
| 5,537,588 | 7/1996 | Engelmann et al. | 395/600 |
| 5,544,313 | 8/1996 | Shachnai et al. | 395/200.01 |
| 5,581,479 | 12/1996 | McLaughlin et al. | 364/514 A |
| 5,592,452 | 1/1997 | Yoshimoto et al. | 369/58 |

OTHER PUBLICATIONS

Hill, J. "The primer (CD–ROM recording) (CDs of Gold)," Windows Sources, vol. 3, No. 4 (Apr., 1995), pp. 102–105.

Urrows, H. et al. "Erasable–rewritable now, and promised-–introductory notes," Optical Information Systems, vol. 10, No. 1 (Jan–Feb, 1990), pp. 14–28.

Keeton, Kimberly et al., "The Evaluation of Video Layout Strategies on a High–Bandwidth File Server," Proc. of 4th Int'l. Workshop on Network and Operating System Support for Digital Audio and Video, Lancaster, England, UK, Nov. 1993.

Patterson, David A. et al., "A Case for Redundant Arrays of Inexpensive Disks (RAID)," Proc. of SIGMOD'88, ACM 0–89791–268–3/88/0006/0109, pp. 109–116.

*Primary Examiner*—Thomas G. Black
*Assistant Examiner*—Maria N. Von Buhr

[57] ABSTRACT

A method of storing video programs, such as movies, for video-on-demand access includes forming a hierarchy for the movies based upon anticipated frequencies of access. Typically, more than one magnetic disk is used to store the video programs, with each disk being partitioned into concentric annular zones. In one embodiment, there is a direct correspondence between the hierarchy and the assignment of video programs to the annular zones. The movies that are anticipated to have the highest frequency of video-on-demand access are placed in the radially outermost zone until it is filled. The next highest video program is then recorded in the next zone. This pattern is followed until the radially innermost zone is filled. In a second embodiment, the same pattern is followed, but with the movies within the outer zones being strategically located within those zones in order to potentially reduce seek time. In a third embodiment, the highest rated video program in the hierarchy is located in a zone somewhat inwardly from the radially outermost zone, again attempting to provide a grouping that reduces seek time. In a last embodiment, the highest rated video programs in the hierarchy are recorded in the outermost zone, but the remaining video programs are recorded in a random fashion. This last embodiment trades some of the high bandwidth benefit at outer zones for the benefit of ease of implementation.

7 Claims, 6 Drawing Sheets

| ZONE 0 | ZONE 1 | ZONE 2 | ZONE 3 | ZONE 4 | ZONE 5 | ZONE 6 | ZONE 7 | ZONE 8 | ZONE 9 | ZONE 10 |
|---|---|---|---|---|---|---|---|---|---|---|
| $M_2 M_1$ | $M_3 M_4$ | $M_5 M_6$ | $M_7 M_8$ | $M_9 M_{10}$ | $M_{11} M_{12}$ | $M_{13} M_{14}$ | $M_{15} M_{16}$ | $M_{17} M_{18}$ | $M_{19} M_{20}$ | $M_{21} M_{22}$ |

FIG. 5

| ZONE 0 | ZONE 1 | ZONE 2 | ZONE 3 | ZONE 4 | ZONE 5 | ZONE 6 | ZONE 7 | ZONE 8 | ZONE 9 | ZONE 10 |
|---|---|---|---|---|---|---|---|---|---|---|
| $M_8 M_7$ | $M_4 M_3$ | $M_2 M_1$ | $M_5 M_6$ | $M_9 M_{10}$ | $M_{11} M_{12}$ | $M_{13} M_{14}$ | $M_{15} M_{16}$ | $M_{17} M_{18}$ | $M_{19} M_{20}$ | $M_{21} M_{22}$ |

|  | FIG. 3 APPROACH | FIG. 4 APPROACH | FIG. 5 APPROACH |
|---|---|---|---|
| SEEK TIME (ms) | 3.7054 | 3.3849 | 3.1906 |
| ROTATIONAL LATENCY (ms) | 4.1702 | 4.1702 | 4.1702 |
| TRANSFER TIME (ms) | 17.2870 | 17.2870 | 17.5354 |
| TOTAL | 25.1625 | 24.8421 | 24.8965 |

FIG. 6

| PERCENTILE DISTANCE | SKEW DEGREE = -1 | | | SKEW DEGREE = -2 | | |
| --- | --- | --- | --- | --- | --- | --- |
| | 64K | 128K | 256K | 64K | 128K | 256K |
| 0 | 25.24 | 37.28 | 61.37 | 20.91 | 32.22 | 54.85 |
| 0.1 | 25.04 | 37.22 | 61.59 | 21.29 | 32.95 | 56.27 |
| 0.2 | 25.11 | 37.54 | 62.39 | 21.79 | 33.88 | 58.05 |
| 0.3 | 25.41 | 38.16 | 63.65 | 22.36 | 34.93 | 60.07 |
| 0.4 | 25.78 | 38.90 | 65.13 | 22.89 | 35.99 | 62.17 |
| 0.5 | 26.32 | 39.86 | 66.95 | 23.47 | 37.15 | 64.50 |

*FIG. 7*

ZONE BIT RECORDING ENHANCED VIDEO DATA LAYOUT

TECHNICAL FIELD

The invention relates generally to video-on-demand systems and more particularly to methods and systems for storing video programs, particularly movies, to be independently accessed by users from different geographical locations.

BACKGROUND ART

Figure 1:
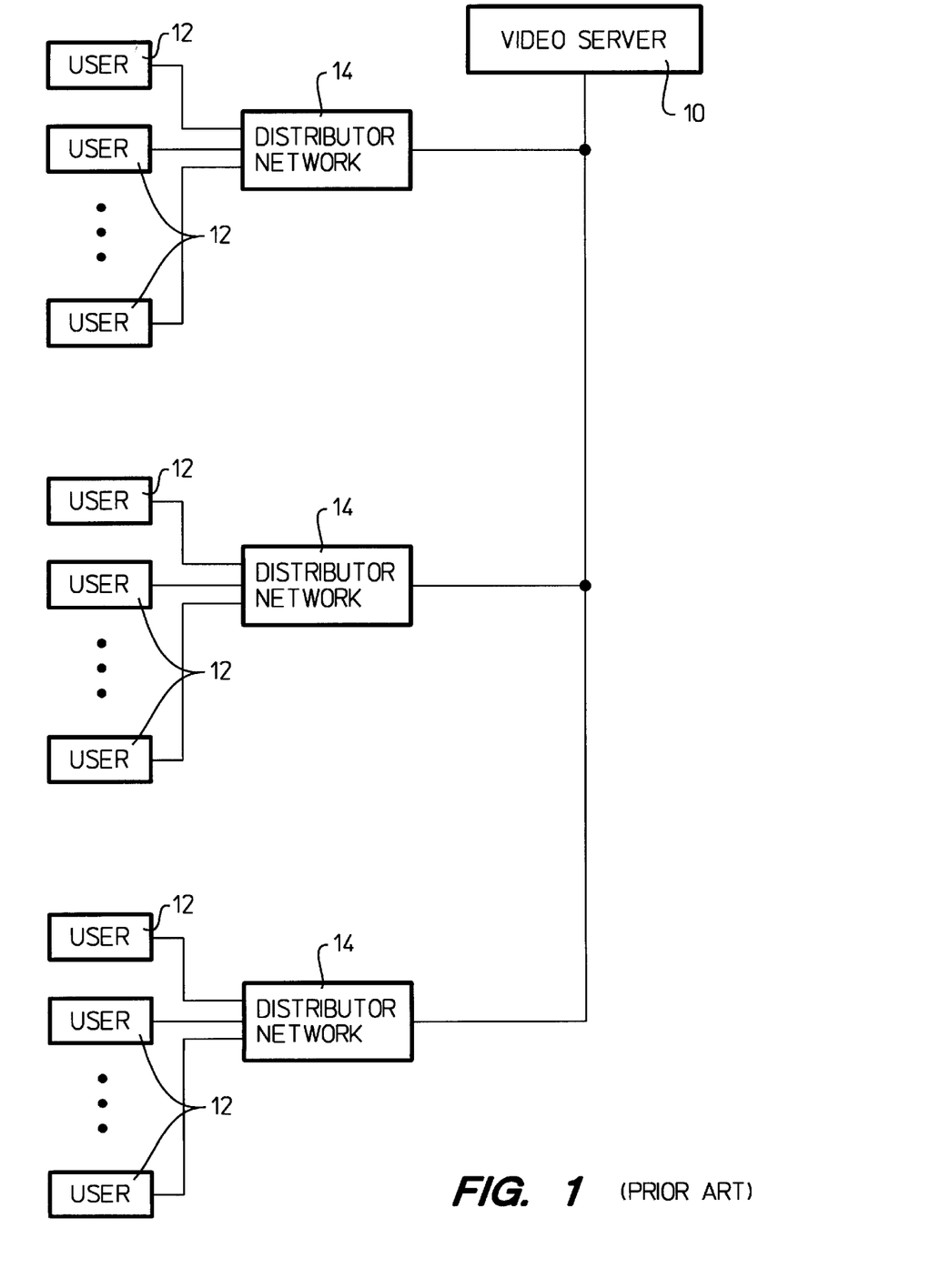
FIG. 1 is a block diagram of a prior art video-on-demand distribution system.

Rapid progress in high speed networking and mass storage technologies has made it possible to provide video-on-demand services, which deliver movies to homes at viewers' requests. The three major components of such a service are shown in FIG. 1. The movies are stored in a compressed digitized video data format at a central server 10. Users 12 submit viewing requests to the central server. A request may be made by telephone, but other means of communication may be utilized. Upon receiving a request, the server retrieves movie streams from mass storage and delivers the movie streams to a distribution network 14 associated with the requesting subscriber. The movie streams are directed to the subscriber, who possesses a set-top box that accomplishes the decompression necessary for movie playback.

Typically, movies are stored at the central server 10 on multiple disks or redundant arrays of inexpensive disks (RAID). In multi-media and video applications, a large amount of data must be retrieved from disks in a timely fashion. Since the disks account for a significant portion of the overall system cost, the disk input/output subsystem needs to be carefully designed in order to meet both performance and cost goals. As noted by Patterson et al. in an article entitled "A Case for Redundant Arrays of Inexpensive Disks (RAID)," In Proc. of SIGMOD'88, ACM 0-89791-268-3/88/0006/0109, pages 109–116, the challenge presented by the exponential growth in processor and memory speeds may be met in a cost-efficient manner by using RAIDs.

A concern for the video-on-demand industry is providing simultaneous access to the same movie or other video program to a number of different subscribers. Keeton et al. present one strategy in "The Evaluation of Video Layout Strategies on a High-Bandwidth File Server," Proc. of the 4th Int'l. Workshop on Network and Operating System Support for Digital Audio and Video, Lancaster, England, U.K., November, 1993. The layout strategy of Keeton et al. includes recording the video data in a manner that allows the data to be played back in different resolutions. Multiple representations of video are stored on a video server to provide different "quality of service" playbacks. This strategy requires video compress algorithms to support the decomposition by resolutions. Each request by a user can then be satisfied with a representation that is designed to match the requested quality of service, and requires only decompression for playback. The storage of multiple representations of video data may be used to accommodate a number of simultaneous playback requests, since the server may switch the representations of some video streams to use those that place less demand on the server, the network, or both.

In comparison, U.S. Pat. No. 5,172,413 to Bradley et al. describes use of a central electronic library to store and deliver high-demand entertainment programming to local community electronic libraries that channel the programming to subscribers. On the other hand, low-demand programming is stored and delivered directly from a local community electronic library located in an area in which there may be a special interest in the programming. The patent teaches that the technique maximizes access capacity and minimizes investment cost.

What is needed is a data layout approach that allows simultaneous and independent video-on-demand access to video programs without requiring viewing of a particular video program by a number of subscribers to be initiated simultaneously.

SUMMARY OF THE INVENTION

A method of storing more than one video program for video-on-demand access includes determining a rating strategy for ranking the video programs based upon which programs are anticipated to have the greatest likelihood of being simultaneously accessed by a number of subscribers. The video programs are stored on at least one disk and differences in data-transfer characteristics of a disk drive with distance from the center of the disk are utilized to improve an input/output (I/O) performance of a video server.

While the angular velocity of the rotating magnetic disk is uniform along the radius of the disk, linear velocity changes with distance from the center of the disk. The linear velocity at the radially outward portion of a disk is more than the linear velocity at the radially inward portion. In order to maximize the data capacity of a disk, parameters can be changed during the recording of data in accordance with the position of a data track relative to the center. This provides a fixed number of bits per unit length of each track, i.e. a fixed linear density. However, to simplify the management of disk transfers, it is known to use a multi-zone approach that divides the disk into concentric annular zones. Tracks within a particular annular zone of a prerecorded disk will have the same measure of bits per track, but tracks in radially outward zones will have more bits per track than tracks in radially inward zones.

The likelihood of independent and simultaneous requests for a video program, such as a movie, depends upon the frequency at which the program is accessed. The video programs may be ranked on a basis of information related to at least two of the movies release date, the box office income and the movie review rating. In the preferred embodiment, the ranking is based upon all three of the elements, as well as the single stream data rate and the usage history of the video program. Such a ranking of movies provides a continuum from a "hot" movie that is typically a recent movie to a "cold" movie that is typically older and less popular.

In one embodiment, the video programs are placed on at least one disk for storing digitized video data, with the assignment of the video programs to the annular zones being determined strictly upon the anticipated frequency of video-on-demand access. The video program that is anticipated to have the highest frequency of access is positioned in the outermost annular zone of the disk. The remaining video programs are located on the disk or disks in accordance with the hierarchy established by ranking the video programs. This rating strategy takes advantage of the high bandwidth of the radially outer annular zones and allows most of the input/output requests to go to these outer zones. Typically, each video program will be on a number of disks in a disk array, such as a RAID. Digitized video data for a particular program is distributed, or striped, across the disks to occupy the same position in each disk. This parallelism allows a higher transfer rate, as the disks cooperate to satisfy a single request.

In a second embodiment, the placement of the video programs on the disks takes into account both the difference in bandwidth for different annular zones of the disks and the seek time for accessing the data. For example, the "hottest" movie may be started at the innermost track of the outermost zone, followed by the next hottest movie. After the outermost zone has been filled, the remaining movies are recorded in descending order of the ranking, starting at the outermost track of the next-to-outermost zone.

In a third embodiment, the video programs are positioned according to a "percentile-difference" of a zone relative to the outermost zone. The value of the percentile-distance is selected, whereafter the hottest movies are positioned in a sub-outer zone determined by the value. After the sub-outer zone has been filled, the hierarchy is followed to fill zones on alternating sides. The motivation of this approach is to place the hot movies toward the central tracks of the disks. Seek time is potentially reduced, but at a sacrifice of some of the high bandwidth benefits of the outermost zone. This approach is the best approach if the gain that results from reduced seek time is greater than the loss due to reduced bandwidth. In actuality, the second embodiment is a special case of this embodiment, but with a percentile-difference value of zero.

In yet another embodiment, the hottest video programs are placed in the radially outermost zone, but the remaining video programs are randomly recorded in the remaining zones. The improvement provided by this approach is less than that of the previous embodiments. However, this embodiment carries the advantage of ease of implementation, since a release of a movie having an anticipated high frequency of video-on-demand access can be easily recorded to replace a previously hot movie without rearranging all of the digitized video data contained on the entire disk or disk array.

BEST MODE FOR CARRYING OUT THE INVENTION

Figure 2:
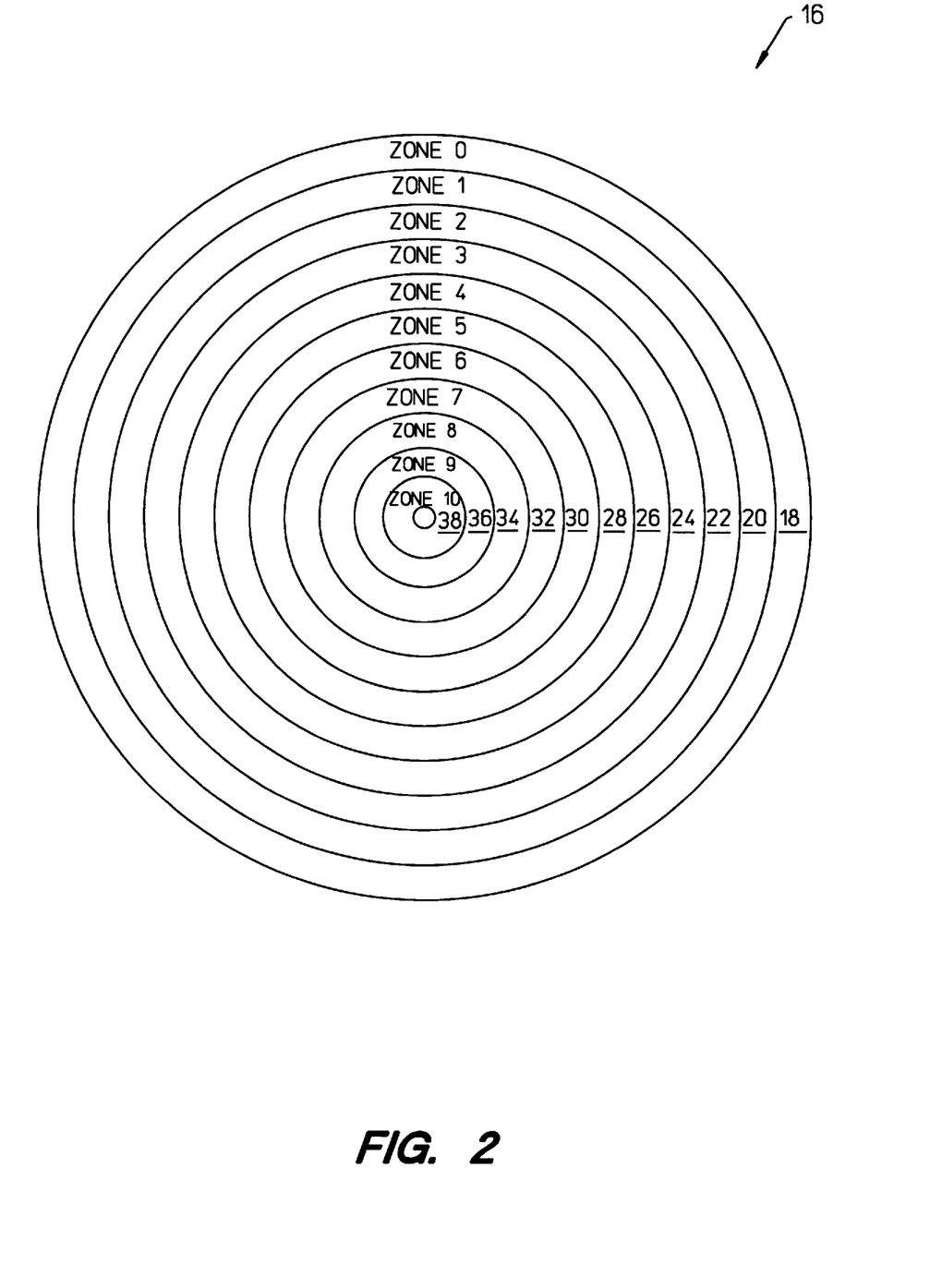
FIG. 2 is a top view of a multi-zone disk structure in accordance with the prior art.

With reference to FIG. 2, magnetic disk drives typically include several disks 16, with each disk containing digitized video data. At one time, disk manufacturers used a fixed annular density scheme in which data was recorded with a fixed number of bits in each track. Since the parameters of radially inward tracks and radially outward tracks are significantly different, the bit densities of outer tracks were substantially lower than the bit densities of inner tracks. In order to achieve higher capacity, disks may be provided with a fixed linear density scheme in which data is recorded with a fixed number of bits per unit length for each track. To simplify the management of data transfers, disk manufacturers may use a multi-zone structure that approximates the fixed linear density scheme. That is, the disk may be divided into eleven concentric annular zones 18, 20, 22, 24, 26, 28, 30, 32, 34, 36 and 38. Each track within a particular annular zone has the same number of bits per track as the other tracks within the same zone, but tracks in a radially outward zone contain more bits than tracks in inner zones.

A multi-zone structure is adopted in the drive sold by Hewlett-Packard Company under the model number HP C2490A. This drive is a 3.5 in. 2GB drive that establishes eleven zones. The outermost annular zone 18 includes 174 tracks, each of which has 108 sectors, with 512 bits in each sector. In comparison, the innermost zone 38 of this particular drive includes 128 tracks having 68 sectors of 512 bits in each track. Thus, the ratio of data sectors from the outermost zone 18 to the innermost zone 38 is 1.6:1. This implies that with a uniform rotational speed the outermost zone data bandwidth is 1.6 times greater than that of the innermost zone when transferring data between the disk 16 and a controller.

The invention attempts to take advantage of the difference in bandwidth in order to improve performance at a central server 10 previously described with reference to FIG. 1. A central server will typically store a mix of "hot" and "cold" movies, with the more recent, popular movies being hot and the older, less frequently watched movies being cold. The temperature of a movie is a measure of the bandwidth requirement of a particular movie. In addition to storing movies, the central server 10 may be required to store other video programs, such as games.

For purposes of the central server 10, the "temperature" of a video program, such as a movie, is a function of the likelihood of simultaneous but non-synchronous viewings. Ranking elements for establishing a hierarchy of movies include data related to a movie release date, box office income, the movie review rating, the usage history and the stream data rate of the recorded digitized video data.

Figure 3:
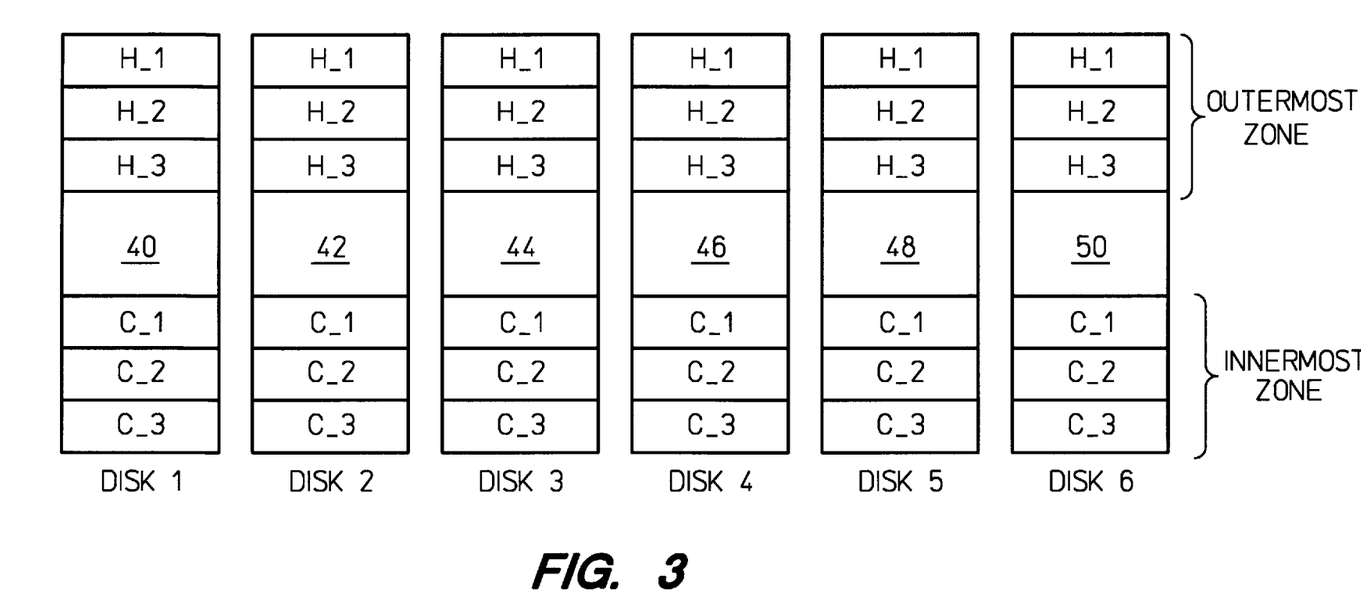
FIG. 3 is a schematic representation of digitized video data recorded on an array of disks in accordance with the present invention.

In the video server model of FIG. 3, there are n movies stored on six disks 40, 42, 44, 46, 48 and 50 attached to a server. Each movie is striped across all of the six disks. The n movies are ranked according to their temperatures. The hottest movie is designated as $H_1$ and the coldest movies movie is designated as $C_1$. Since each disk contains part of each movie and the video server is expected to support multiple concurrent movie streams, a drive arm is expected to move when switching from stream-to-stream.

For purposes of the invention, "percentile-distance" of an annular zone is defined as the percentile position of the zone relative to the outermost zone. For example, in FIG. 2, the center zone 28 has a percentile-distance of 0.5, the innermost zone 38 has a percentile-distance of 1.0, and the outermost zone 18 has a percentile-distance 0.

The first embodiment of the invention is shown in FIG. 3. In this embodiment, the hottest movie, i.e. the movie that is anticipated to have the highest frequency of video-on-demand access, is in the outermost zone. Assignment of the other movies to the zones of the disks 40–50 is in strict accordance with the hierarchy of movie temperature, but the movies may be randomly recorded within a zone. This approach takes full advantage of the high bandwidth of the radially outward zones and allows a high percentage of the input/output requests to be localized to these high bandwidth zones.

Figure 4:
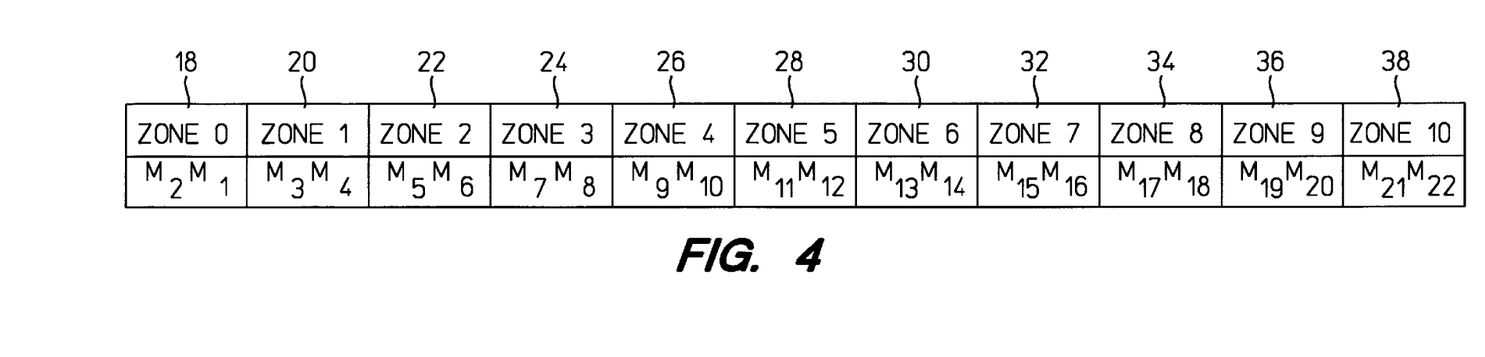
FIG. 4 is a schematic representation of a second embodiment of the invention, with digitized video data being recorded in view of both seek time and differences in bandwidth among annular zones.

FIG. 4 illustrates another embodiment of the invention. Only one disk of an array is shown in FIG. 4, so that only segments of each movie are represented in the figure. In this approach, the seek time for locating a particular movie is potentially reduced. The embodiment represented by FIG. 4 places the hottest movie ($M_1$) starting from the innermost track of the outermost zone 18, followed by $M_2$. After the first zone 18 is filled, the next movie in the hierarchy of anticipated frequency of video-on-demand access is placed in the outermost track of the next outermost annular zone 20. As shown in FIG. 4, the hierarchy is followed until the entire disk is filled. This closer arrangement of the hottest movie $M_1$ to each of the next three movies in the hierarchy has a potential of reducing the seek time.

Figure 5:
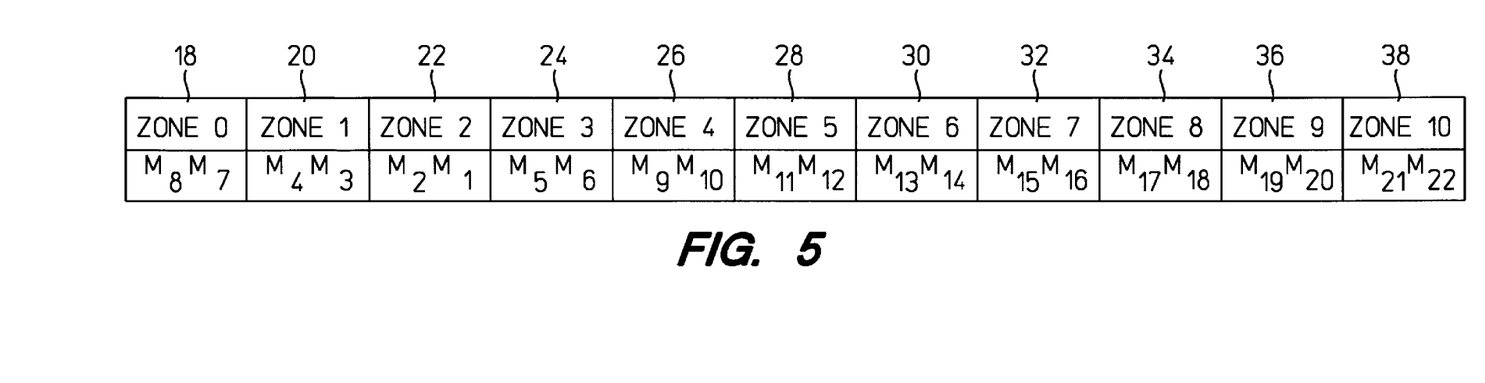
FIG. 5 is a schematic representation of a third embodiment of the invention.

Another embodiment is shown in FIG. 5. This approach differs from the previous two approaches by placing the hot movies starting from a sub-outer zone that has a selected percentile-distance d, as defined above. The value d is an adjustable parameter. In the case of an HP C2490A drive, if the percentile-distance d=0.2 and each annular zone 18–38 can hold two movies or the appropriate segments of two movies, then this approach will start the hottest movie $M_1$ at the innermost track of annular zone 22. When zone 22 is filled, the next hottest movie $M_3$ is started in the adjacent zone 20 outward of the original zone 22. These zones are filled in an alternating pattern until the radially outward zones are filled, whereafter movies are recorded by successively moving to the next inner annular zone.

The motivation for the approach of FIG. 5 is that by placing hot movies within central tracks of the disk, seek time can be potentially reduced. While there is a sacrifice of some high bandwidth benefit of the radially outermost zones as compared to the previous two approaches, in some applications the gain resulting from reduced seek time is greater than the loss in performance due to the sacrifice of some of the high bandwidth benefit. The tradeoff will be discussed more fully below.

In this approach, the percentile-distance d that is selected should not be greater than 0.5. If d is greater than 0.5, the hottest movies will be in the radially inward portion of the magnetic disk, and there will be no gain resulting from reduced seek time. On the other hand, if the d=0, the movie arrangement of FIG. 4 is achieved, so that the arrangement is no longer a sub-outer zone approach.

In yet another embodiment of the invention, the hot movies are placed in the outermost annular zone 18 of FIG. 2. However, the remainder of the movies in the hierarchy may be randomly placed in the remaining annular zones 20–38. While the video-on-demand performance that is achieved using this approach is expected to be less than the performances achieved using the other approaches, the acquired benefit is that the strategy is more easily implemented. That is, it is easier to replace hot movies on the magnetic disks. For example, when a new movie is released, it is only necessary to provide recording space within the radially outermost zone 18. It is not necessary to follow the layout patterns imposed by the approaches of FIGS. 2–5. This strategy trades some performance for ease of implementation.

The various video data layout approaches were performance tested. The simulation testing was done using the HP C2490A drive, as well as the Hewlett-Packard Company drive sold under the model number HP C2247 3.5 in. 1 GB, having disks partitioned into eight zones, and the Seagate 3.5 in. 2 GB drive sold under the model number ST32550. In order to quantitatively characterize the temperature of movies, the "$s^{th}$ of skew" function was used. This function defines the probability $p_m$ of a subscriber request for a particular movie $M_m$ as follows:

$$p_m = \frac{m^s}{\sum_{i=1}^{i=n} i^s} \quad m = 1, 2, \ldots, n.$$

where n is the total number of movies to be stored in the video server. It should be noted that when parameter s=0, the movie temperature is uniformly distributed, i.e., each movie has the same probability of being selected for viewing. When s=−1, it is the Zipf's distribution, in which approximately 49% of viewers will select the top 10% of hot movies. When the value of parameter s decreases, the viewers' selections become more skewed, which is likely to happen in practice, based on current information related to usage patterns. For example, when s=−2, approximately 80% of viewers select the top 10% of hot movies.

In the simulation study, movies were recorded on disks according to the approaches described above. For each run, more than 100,000 input/output requests were generated, and each request was directed to movie $M_m$ with probability $p_m$ as defined in the equation. If a movie occupies k cylinders of a RAID, then a request randomly went to one of the k cylinders. Confidence intervals of 95% were obtained by using the method of independent replications. The confidence interval widths were less than 2% of the point estimates of the disk service times.

Initially, the movie hotness skew degree will be fixed at −2. The results of the performance testing will be shown for an I/O transfer size of 128 KB, but similar results were obtained as the I/O transfer size was varied from 64 KB to 256 KB. With regard to the approaches of FIGS. 3, 4 and 5, the performances were close, with one approach being slightly better than the others. In particular, the approach of FIG. 4 was observed to be consistently better than that of FIG. 3, since the FIG. 4 approach performed seek optimizations within zones. Between the sub-outer zone approach of FIG. 5 and the outer zone approaches of FIGS. 3 and 4, the performance orderings varied according to the movie hotness skews.

Figure 6:
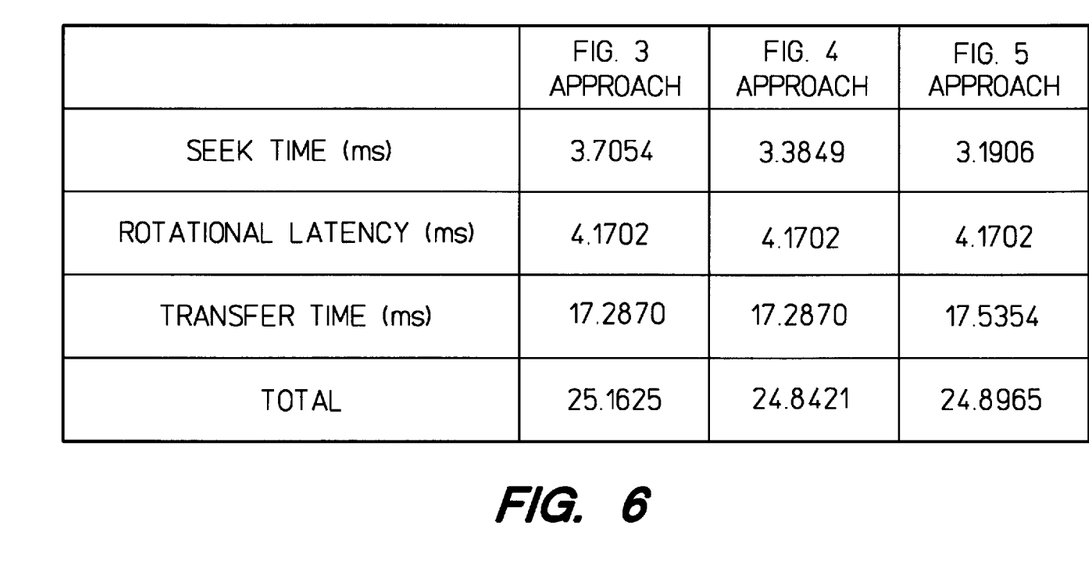
FIG. 6 is a table acquired during performance tests of the embodiments of FIGS. 3–5.

FIG. 6 is a table of performance results for the approaches of FIGS. 3–5, with the movie hotness skew degree of s=−2 for the Seagate drive. The time is the mean time for the 128 KB I/O transfers. The approach of FIG. 4, in which movies within groups of movies were arranged with a goal of reducing seek time, has the same rotational latency and transfer time as the FIG. 3 approach, but has a reduced seek time. On the other hand, the sub-outer zone approach of FIG. 5 has a reduced seek time, but a higher transfer time, as compared to the FIG. 4 approach. In the performance testing with the skew degree being −2, in which 88% of customers select the top 10% of the movies in the temperature hierarchy, the overall performance of the FIG. 4 approach is slightly better than that of the FIG. 5 approach. This was also true for the two Hewlett-Packard Company drives used in the performance testing.

The mean disk service times obtained using the FIG. 4 approach were compared to required times for a non-hierarchical approach in which movies were randomly located on disks. The results showed that the FIG. 4 approach performed 20% better than the random approach for the ST32550 and HP C2490A drives. For the HP C2247 drive, the FIG. 4 approach out-performed the random approach by 23%.

When the transfer size was reduced to 64 KB, the improvement for the 2 GB drives increased to 23%, and when the transfer size was increased to 256 KB, improvement decreased to approximately 17%. For the HP 1 GB drive, the random approach was out-performed by approximately 23% for various transfer sizes.

In the case of a skew degree=−2, the data bandwidth achieved using the FIG. 4 approach was approximately 98% of the outermost zone bandwidth of the 2 GB drives and approximately 99% of the HP 1 GB drive. When movie skew decreased to skew degree=−1, the achievable data bandwidths using this approach were still above 90%.

Figure 7:
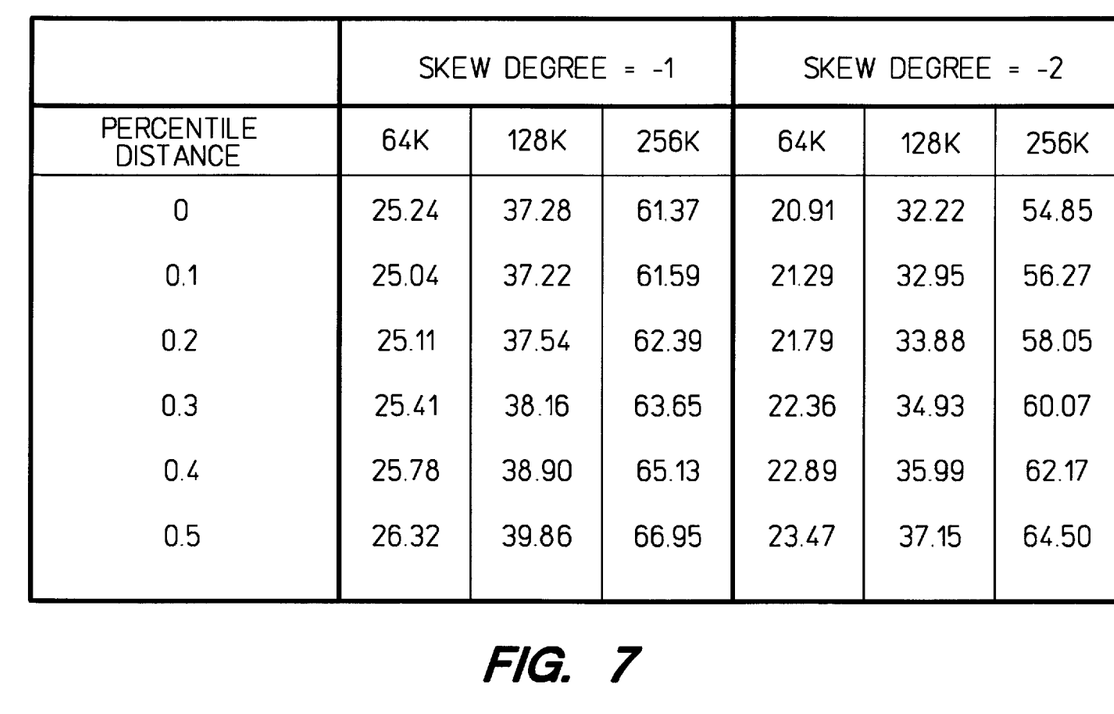
FIG. 7 is a table acquired to a comparison test for the embodiment of FIG. 5.

Turning to the approach of FIG. 5, wherein the hottest movie is located in a sub-outer zone, FIG. 7 is a table of mean disk service times acquired by varying the percentile-distance parameter d. The mean disk service time includes seek time, rotational latency and the data transfer time for the media to the appropriate controller. The HP C2490A drive was used to acquire the data of FIG. 7. When the movie hotness skew degree was −1, which allows the Zipf's law, the best disk performance was achieved when d=0.1, except for the case of a transfer size of 256 KB. When the hottest movies were placed closer to the center of the disks, the mean disk service time increased, which indicates that the gain achieved from reducing seek time does not compensate for the loss of high data bandwidth in outer zones. When movie temperature is more skewed (skew degree=−2), recording the hottest movies in the outermost zone resulted in the best performance, since more I/O requests will be directed at the hottest movies and less disk seek time will be involved. Therefore, the savings with regard to seek times by placing hot movies in sub-outer zones becomes less prominent.

The same behavior was observed for the Seagate ST32550 drive, with the exception that when transfer size was 256 KB, the drive still achieved the best performance with the percentile-distance parameter d=0.1. The behavior of the HP C2247 drive, however, was slightly different, since the best performance was always achieved by placing the hottest movies in the outermost zone. Part of the reason for this behavior is that the drive has a large outermost zone, which accounts for approximately 27% of the total area. In comparison, the HP C2490A has an outermost zone that occupies only approximately 7% of the total area.

Now comparing the approach of FIG. 4 with the approach of FIG. 5, the FIG. 4 approach attempts to fully utilize the high bandwidth of the outermost zone and the FIG. 5 approach trades some bandwidth benefit for reduced disk seek time. In general, as the I/O transfer size increased, the FIG. 4 approach performed better, since the data transfer time became a more dominant factor. On the other hand, if the I/O transfer size remained relatively small and the hotness of the movies was more skewed, the sub-outer zone strategy of FIG. 5 became more attractive.

The last identified embodiment was one in which the hot movies were in the outermost zone, but the remaining movies were located at random. A performance test was performed with the I/O transfer size at 128 KB and the hot movie skew degree at −2. The approach of the last embodiment out-performed a completely randomized placement of movies by approximately 16%. On the other hand, when the skew degree was −0.5, the performances of the last approach and the completely randomized approach were close.

We claim:

1. A method of storing a plurality of independent video programs for video-on-demand access comprising the steps of:
   determining a rating strategy for ranking said plurality of independent video programs, including using anticipated frequency of video-on-demand access of each of said video programs as a ranking element of said rating strategy, wherein there are at least three video programs and each of said video programs has a unique rating rank in accordance with the rating strategy;
   establishing a hierarchy for said video programs based upon said rating ranks;
   providing a storage device having at least one disk for storing digitized video data within discrete annular zones of tracks such that said disk has a radially outermost annular zone and a radially innermost annular zone;
   prior to recording any of said video programs onto said storage device, determining an order in which to position said video programs along said storage device, including basing said order on said rating ranks; and
   while remaining consistent with respect to use of recording techniques, recording said plurality of video programs on said storage device such that said video programs are arranged in said order, with said outermost annular zones having video programs with the highest rating ranks.

2. The method of claim 1 wherein said step of providing said storage device includes providing an array of magnetic disks having said discrete annular zones and wherein said step of recording said plurality of video programs includes recording different segments of each video program in corresponding zones of a plurality of magnetic disks.

3. The method of claim 1 wherein said using anticipated frequency of video-on-demand access of said video programs includes ranking movies based upon information related to at least two of a release date, box office income and a movie review rating.

4. The method of claim 1 wherein said step of recording said plurality of video programs includes arranging digitized video data for each said plurality of video programs in annular zones of said first disk, with digitized video data of video programs anticipated to have the highest frequency of video-on-demand access being recorded in outermost annular zones of said first disk and with digitized video data of video programs anticipated to have the lowest frequency of video-on-demand access in innermost annular zones of said first disk, said video programs being movies.

5. A system for providing access to movies on a video-on-demand basis comprising:
   a video server for storing and providing video-on-demand access of at least four of said movies to a plurality of separate subscribers; and
   a plurality of magnetic disks on which said movies are magnetically recorded, each disk being partitioned into at least four discrete concentric annular zones of tracks, including a first group of radially outermost annular zones and a second group of radially innermost annular zones, said first group of radially outermost annular zones containing digitized video data of those movies that are anticipated as having a highest frequency of video-on-demand access by said subscribers, said second group of radially innermost annular zones containing digitized video data of those movies that are anticipated as having a lowest frequency of video-on-demand access by said subscribers.

6. The system of claim 5 wherein each movie is divided into a plurality of segments, said segments being within radially corresponding annular zones of a plurality of said disks.

7. The system of claim 5 wherein for each movie a distance of said movie relative to a center of said each disk corresponds to an anticipated frequency of video-on-demand access relative to anticipated frequencies of all other of said movies.

* * * * *